United States Patent [19]

Head et al.

[11] 4,102,785

[45] Jul. 25, 1978

[54] INSIDE-TO-OUTSIDE FLOW FILTER TUBE AND METHOD OF USING SAME

[75] Inventors: Brian Arthur Head, Maidstone, England; Philip C. Kimball, Andover, Mass.

[73] Assignee: Whatman Reeve Angel Limited, Maidstone, England

[21] Appl. No.: 803,408

[22] Filed: Jun. 3, 1977

Related U.S. Application Data

[63] Continuation of Ser. No. 679,569, Apr. 23, 1976, abandoned.

[51] Int. Cl.² ........................................... B01D 37/00
[52] U.S. Cl. ..................................... 210/65; 55/487;
55/520; 55/524; 210/484; 210/487; 210/504;
210/505; 210/507; 210/509; 210/DIG. 5;
428/36
[58] Field of Search ............. 210/DIG. 5, 483, 484 R,
210/488, 489, 490, 491, 492, 496, 497, 497.1,
500 R, 502, 503, 504–510, 65; 55/520, 486, 487,
524; 428/36, 377

[56] References Cited

U.S. PATENT DOCUMENTS

| 3,061,107 | 10/1962 | Taylor | 210/DIG. 5 |
| 3,062,377 | 11/1962 | Howard et al. | 210/487 |
| 3,063,888 | 11/1962 | Howard et al. | 210/484 |
| 4,052,316 | 10/1977 | Berger | 210/315 |

*Primary Examiner*—Frank Sever
*Attorney, Agent, or Firm*—Richard P. Crowley

[57] ABSTRACT

An improved inside-to-outside flow filter tube and method of manufacturing the tube, which filter tube comprises: a plurality of nonwoven fibers having interstices therebetween to define the porosity of the filter tube, the tube containing a binding agent at the junction of the fiber crossovers to provide a self-supporting structure of a defined wall thickness and filter porosity; and an open scrim reinforcing sheet material within the wall of the filter tube extending generally the length of the tube and at least one overlapping revolution about the tube diameter, the fibers of the filter tube bonded integrally through the open scrim material, thereby permitting the use of the filter tube in applications requiring inside-to-outside fluid flow without the necessity for an external peripheral support.

28 Claims, 3 Drawing Figures

INSIDE-TO-OUTSIDE FLOW FILTER TUBE AND METHOD OF USING SAME

This is a continuation of application Ser. No. 679,569, filed Apr. 23, 1976 (now abandoned).

BACKGROUND OF THE INVENTION

Most disposable cartridge filters are usually operated with outside-to-inside flow direction of the liquids or gases to be filtered. The outside-to-inside flow permits a greater dirt-holding volume in the filter housing than if inside-to-outside flow were used. In addition, it is easier to support the filter tube to resist high differential pressures when the flow direction is outside-to-inside, because the smaller-diameter mechanical support (usually a perforated tube or porous rigid tube) can usually be fabricated from commercially available materials, while a larger-diameter support for the outside of the cartridge usually requires custom fabrication.

There is another reason that internal support is usually preferred over external support, which applies particularly to disposable cylindrical filter tubes; for example, with approximately $\frac{1}{8}$-inch wall thickness, made from a nonwoven random network of glass fibers 0.1 to 10 microns in diameter and bonded at the junction of the fibers by a hardened material, such as a resin. Filter tubes of this general type are described, for example, in U.S. Pat. No. 3,767,054, issued Oct. 23, 1973, hereby incorporated by reference. Filter tubes of this type are commonly manufactured by forming onto the external surface of a cylinder, either by depositing fibers onto a porous cylinder wall by vacuum, or by rolling a sheet of fibers onto the wall of the cylinder. As a result, the inside diameter of the filter tube is almost exactly the same as the outside diameter of the forming cylinder, and, therefore, the inside diameter of the filter tubes can be made uniform and generally reproducible from tube to tube in production. For example, a control range of ± 0.005 inches on the tube internal diameter, or even less, is easily achieved. However, since the outside diameter of the filter tube is not confined during the forming process, control of the diameter is much more difficult, and the variability in outside diameter from tube to tube is much greater, typically ± 0.030 inches or more.

The variability in external diameter of filter tubes of this type has made the design and fabrication of external supports much more difficult and expensive than internal supports. For example, a reusable internal support of perforated metal or plastic (as shown in U.S. Pat. No. 3,767,054) is quite feasible, because the close control of internal diameter of the filter tubes assures that each filter tube will fit the support perfectly. It will be appreciated that satisfactory performance of the support requires that the internal diameter of the filter tube be large enough to permit the tube to be fitted; e.g., slid, over the support easily, and yet the internal diameter of the filter tube must not be considerably larger than the support core or else the support core will not adequately prevent rupture of the filter tube.

With the wide variability of outside diameters of the filter tubes, it has been impractical to design a reusable external support core. A support core which is large enough to fit over filter tubes at the large end of the diameter range will be too loose to support filter tubes at the small end of the diameter range. Even a disposable external support core is difficult and expensive, because the support core must be strong enough to prevent the filter tube from bursting, yet malleable enough to conform closely to the variable outside diameter dimensions of the filter tube. The external support problem may be solved by forming or casting the filter tube inside a rigid perforated or porous support, such as a screen, but this manufacturing procedure is inherently more expensive and difficult than forming the filter tube on the outside of a cylinder or mandrel.

Despite the difficulties in providing adequate dirtholding capacity or burst strength for the filter tubes, there are definite advantages to filtering fluids in the inside-to-outside direction under certain conditions and for certain purposes. For example, when coalescing and removing liquid droplets from air or other gases, the inside-out flow direction is essential to permit drainage of the coalesced liquid and minimize the chance of reentrainment and carryover of coalesced liquid by the gas (see *Hydraulics and Pneumatics,* August 1974, "Coalescing Filters Produce Clean Air for Fluidic Systems" (herein incorporated by reference).

Another example in which inside-out flow is desirable is in coalescing and separating of two or more liquid phases. In this procedure, the filter collects and coalesces droplets of the dispersed liquid phase and produces two distinct liquid phases which may then be easily separated. However, the coalescing action takes place throughout the depth of the filter tube element, and the clean separation of the two liquid phases occurs on the downstream surface of the filter tube. If the flow direction is outside-to-inside, the acceleration of the liquid as it leaves the relatively small flow area inside the tube tends to mix the two liquid phases and redisperse the discontinuous phase. However, if flow is inside-to-outside, the liquid leaves the filter surface at minimum velocity, and the two liquid phases can separate cleanly within the filter housing.

A further example in which inside-to-outside flow is desirable is when a two-stage treatment of the fluid is desirable; for example, contacting the liquid with a sorbent material, such as an adsorbent clay or diatomaceous earth, followed by filtration. If flow is inside-to-outside through the filter tube, the loose powder, granular, or fibrous material which is used for the sorbent pretreatment, either as a filter aid or precoat material, or both, may be conveniently preloaded into the inside of the filter tube, and if necessary, held in place with perforated end caps. The single disposable filter tube cartridge then conveniently serves both to pretreat and filter the fluid. If flow were outside-to-inside through the filter tube, it would be difficult or impossible to retain a precoat of powder, granular, or fibrous material on the outside of the filter tube, and therefore a less convenient two- or multiple-step filter process would be required, such as is described in Bulletin TI-62, 1973, of Balston, Inc. (hereby incorporated by reference).

SUMMARY OF THE INVENTION

Our invention relates to an improved filter tube and to the process of manufacturing and using such filter tube. In particular, our invention concerns an inside-to-outside flow filter tube of improved burst strength and of improved contaminant-holding capacity, and to the process of manufacturing and using such tube.

Our invention provides an improved disposable filter cartridge designed for flow in the inside-to-outside direction. The improvement comprises, both alone and in combination: an improved tube and method of construction which greatly increases the resistance of the filter tube to bursting when the flow of fluid is in the inside-to-outside direction; and an improved tube and method of construction which greatly increases the contaminantholding capacity of the filter tube when flow of fluid is in the inside-to-outside direction.

In general, our objectives are achieved by incorporating an open supporting scrim sheet material within the diameter of the tube; e.g., the fiber structure of the tube, when the filter tube is being formed, and by packing the interior of the filter tube with a relatively large quantity of a coarser fibrous or particulate material which serves as a pretreatment material; e.g., a precoat and/or prefilter for the fluid to be filtered by the filter tube. It is understood that either one of these improvements may be used independently; that is, the improved burst strength tube may be used without the internal pretreatment material, or the internal pretreatment material may be used with a tube of standard burst strength and prior-art construction. Preferably, both improvements are used together, if the filtration situation requires inside-out flow through the filter tube with improved life (contaminant-holding capacity) and improved burst strength.

Our invention comprises an inside-to-outside flow filter tube, which filter tube comprises: a plurality of nonwoven fibers having interstices therebetween to define the porosity of the filter tube, the tube containing a binding agent at the junction of the fiber crossovers to provide a self-supporting structure of a defined wall thickness and filter porosity; and an open scrim reinforcing sheet material within the wall of the filter tube extending generally the length of the tube and at least one overlapping revolution about the tube diameter, the fibers of the filter tube bonded integrally through the open scrim material, thereby permitting the use of the filter tube in applications requiring inside-to-outside fluid flow without the necessity for an external peripheral support.

In one embodiment, the scrim material is wrapped in an overlapping, contacting, generally circular relationship within the filter tube wall, particularly where the filter tube is manufactured by depositing the fiber slurry onto the external wall of a vacuum mandrel.

In another embodiment, the scrim material is wrapped in an overlapping, generally helically coiled, noncontacting relationship within the filter tube wall, with a layer of fibers between the scrim coil, particularly where the filter tube is manufactured by depositing the fiber slurry onto a flat screen and subsequently rolling on a mandrel.

In the former, the scrim material may comprise one or more distinct and separate circular structures within the wall of the filter tube; although generally and preferably one scrim layer within the inner 50% of the wall depth may be used. In the latter embodiment, the helical coil extends helically through a major part, or less as desired, of the filter tube wall, and extends from all, a part of or none of the internal wall surface of the filter tube, depending on the size and position of the scrim material used on the filter mat to a position such that the other end of the scrim material does not protrude or form a portion of the external wall of the filter tube.

Our process comprises the preparation of filter tubes composed of a plurality of random, nonwoven, inorganic fibers having interstices therebetween to define the porosity of the filter tube, the tube containing a binding agent at the junction of the fiber crossovers to provide a self-supporting structure of defined wall thickness and porosity, the improvement which comprises: positioning, during the manufacture of the filter tube, an open scrim reinforcing sheet material within the wall thickness of the bonded filter tube, the sheet material extending generally the length of the tube and at least one overlapping revolution about the tube to provide an internal filter tube of a high burst strength.

In one embodiment, the fibers form a fiber slurry and are deposited in a desired amount and thickness onto the external wall surface of a cylindrical porous mandrel, and the scrim material wrapped about the deposited fibers and additional fibers from a fiber slurry are then deposited over the wrapped scrim material, the additional fibers being of the desired amount and thickness. If desired, a number of scrim wrappings may be used with additional fibers deposited between each wrapping to provide enhanced burst strength; however, care must be taken not to employ in a thin wall thickness too many scrim layers or scrim wrappings so as to affect the structural integrity of the filter tube, such as to affect segregation of the tube into separate layers which would be detrimental to filter tube strength and performance. In the mandrel coating technique, the scrim material is not desired on the external surface, while scrim, as a part or all of the internal surface in the mat technique, is permissible.

The scrim material useful may comprise a wide variety of open porous sheet materials of sufficient flexibility to be rolled onto the filter tube wall and of sufficient strength to increase the burst strength of the filter tube. Typically, the openings which may be any shape, but preferably are rectangular or square, may range from greater than about $\frac{1}{8}$ of an inch per opening which permits the fibers of the filter tube to become entangled physically with the scrim material during manufacture of the tube, and such opening may range from $\frac{1}{8}$; e.g., $\frac{1}{4}$ to 1 inch; e.g., $\frac{1}{2}$ inch. The scrim material may be composed of inorganic or organic woven or nonwoven fibers and represent substantially a maximum open surface area to avoid interference with fluid flow or to alter the characteristics of the tube or its use. The scrim, for example, may be of the same fiber as employed in the filter tube, and be inert, such as alumina, zirconia or glass fibers or mixtures thereof. Preferably, the same material is used for the scrim as in the fibers of the filter tube, so that there will be no change in tube properties by a different material. Scrim material may be formed of carbon fibers, metal screen material or nylon, polyester or other organic fibers; although such organic fibers are not suggested for high-temperature use of the filter tube.

The filter tube wall thickness may vary as desired, but in typical filter tubes, the wall thickness would range from about 0.100 to 0.200 inches; e.g., 0.125 to 0.150, with a fiber density of about 0.15 to 0.25 grams/cc. Pretreatment materials used internally with our tubes, such as prefilter fibers, would be of much lower density, such as 0.05 grams/cc or less.

The scrim material should be overlapped at least one revolution, such as not less than about 1$\frac{1}{2}$ times, and preferably, up to 3 or 5 revolutions. Too many revolutions should be avoided, particularly in the mandrel method, to avoid a segregation of the wall thickness, while the number of revolutions with the mat technique varies with the length of the mat and scrim material and fiber thickness.

Pretreatment materials useful internally with the filter tubes of our invention encompass a wide variety of fibrous and particulate material (powder or granular) which may function for a variety of purposes, such as prefiltering as with glass fibers, as sorbing materials to remove impurities or other materials by adsorption or absorption, such as clay and diatomaceous earth materials, to remove color bodies from a gas or a liquid-like oil, as sterilizing agents like the use of metal salts, such as silver salts on support materials like silica gel to sterilize water and to filter out visible impurities, as reacting materials, such as catalysts on a support to cause or effect a desired reaction, such as in filter tubes with a reinforced inorganic binder containing an internal noble metal catalyst like platinum or an inert support-like silica, and wherein a high-temperature gas reaction is effected by simply passing hot gas from the inside to the outside of the filter tube, and as ion-exchange agents by employing one or more layers of a suitable ion-exchange resin in the interior of the tube as a pretreatment material to obtain a desired ion exchange. The pretreatment materials, when in fibrous form, may be packed within an internal perforated cylinder within the internal diameter of the tube, or wrapped, such as in kit form, in a helical coil within the internal diameter with or without an internal porous support. Typically, end caps or other means are used to retain the pretreatment materials in place, particularly where the material is in loose particulate form. The pretreatment material may, like the outside coalescing sleeve, comprise an open-cell foam material inserted within the filter tube and adjacent and snugly fitting the internal wall surface of the filter tube.

Optionally, a coalescing sleeve material is about and adjacent the external wall surface of the filter tube, with a typical material comprising an open-cell porous foam or fibrous material with a usual material comprising an open-cell porous urethane foam sleeve to serve as an oil-coalescing material; although other porous materials may be used.

The fibers of the filter tube are nonwoven, randomly disposed fibers often deposited from an aqueous slurry of the fibers, formed into tube form, dried, and then impregnated with a suitable binding agent, and dried or cured to form a semirigid self-supporting filter tube which may or may not be used with a porous support core, depending upon its use. Examples of fibers are alumina, zirconia and glass, particularly borosilicate glass fibers. The fibers may range in diameter and for the applications described are usually less than 10 microns; e.g., 0.001 to 10 microns, such as 0.03 to 8 microns; e.g., 0.1 to 3.5 microns. The binding agents may vary, and include, but are not limited to, hardened resins such as thermosetting or curable resins like phenol-formaldehyde and epoxy resins, as well as silicone resins, the oxides of the fibers used such as silica for glass fibers, and other materials used as binding agents like quaternary ammonium silicates and the like. Preferably, the filter tubes are composed of glass fibers with hardened resin binders; although inorganic binders are useful where the tube is employed in high-temperature use.

In connection with the measurement of the strength of filter tubes, two general strength measurement properties are employed. One property is related to the collapse strength of the tube which is that pressure (psi) at which, when evenly exerted onto the outside surface of the tube, causes the tube to collapse inwardly. This measurement is of particular importance where the tube is to be employed in outside-to-inside fluid flow direction. The collapse strength of a tube determines under particular use conditions whether or not a porous support core is required.

Another property is related to the burst strength of the tube which is that pressure at which, when evenly exerted onto the inside surface of the tube, causes the tube to burst outwardly. This measurement is of particular importance where the tube is to be employed in inside-to-outside fluid flow direction. The burst strength of the tube determines the maximum differential pressure rating to be placed on the filter tube element, and determines whether or not an external support is required in use. Both properties are of importance under some conditions, such as where the filter tube is used as a vent filter with flow occurring in both directions. However, in coalescing-type filters, where inside-to-outside flow is used or necessary, then the burst, and not the collapse, strength of the tube is of significance.

Our filter tubes of improved burst strength and contaminant-holding capacity are particularly useful as filters for exhaust gases, such as for exhaust gases of internal combustion engines, such as crankcase diesel or gasoline-powered automobile engines, for compressed air filtration for air to instruments where an oil-free compressed air is desired, for use in filtering vacuum pump exhaust gases which often have a visible oil mist from the oil of the oil seal of the vacuum pump, and for separating a multiphase liquid, such as removing oil droplets in an aqueous stream, and for other applications where improved burst strength and/or improved contaminant-holding capacity is necessary or desired.

Our invention will be described for the purpose of illustration only in connection with glass-fiber filter tubes in particular applications. However, as is recognized by those persons skilled in the art, various changes and modifications may be made to these illustrative examples, which changes and modifications are and would be within the spirit and scope of our invention. The illustrative examples set forth are to those filter tubes and situations wherein inside-to-outside flow is required.

DESCRIPTION OF THE EMBODIMENTS

Figure 1:
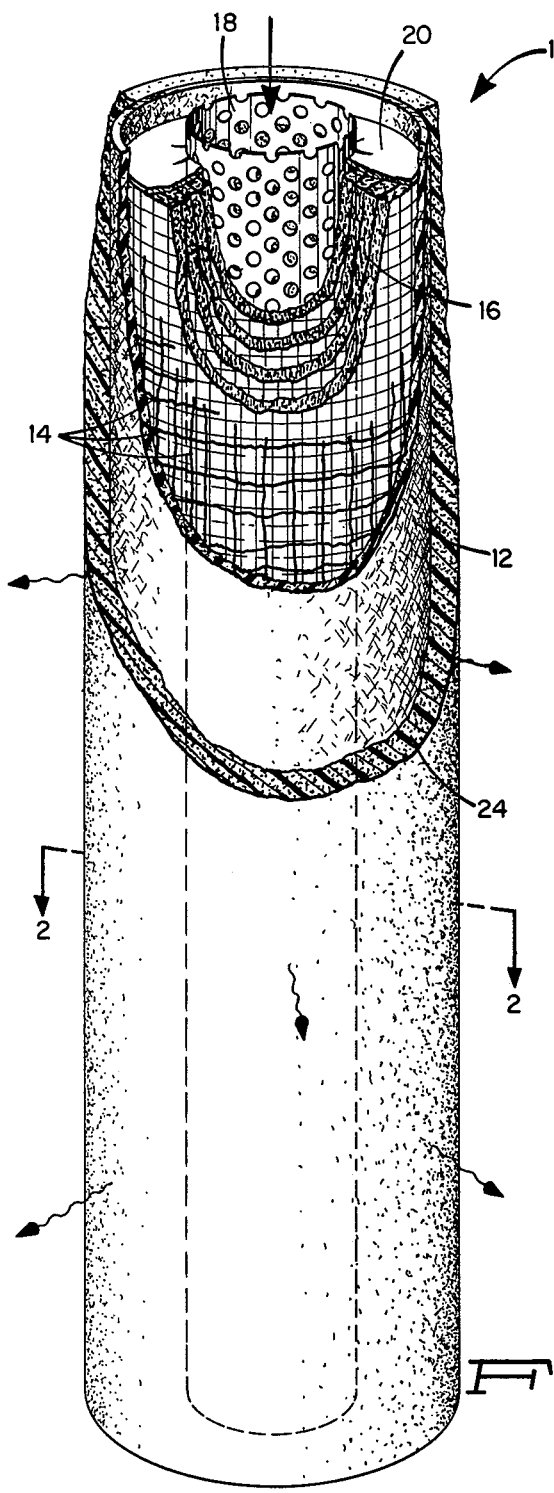
FIG. 1 is a perspective partial cutaway view of a inside-to-outside filter tube assembly of our invention.

FIG. 1 shows an improved inside-to-outside flow filter tube assembly 10 which comprises a filter tube wall 12 of bonded glass fibers and an open, rollable, porous, scrim, woven sheet material 14 composed of multiple strands of glass fibers with generally square openings of about ¼ of an inch per side wrapped about three revolutions and positioned within the fiber wall 12 of the tube. A perforated metal tube 18 is disposed internally within the filter tube with a wrapping of about three to six times of a coarser glass-fiber prefilter mat 16 about the metal tube 18 between the internal wall of the bonded glass fibers 12 and the outside surface of the tube 18 as a prefilter material. Optionally, the mat 16 is rolled within an open screen material. The rolled prefilter mat 16 is retained in place by end caps 20 and 22. About the external wall 12 of the tube is fitted an open-cell, urethane-foam-coalescing filter 24. The end cap 20 contains a central opening for the positioning of a tie rod (not shown) or end flange (not shown) to position the filter tube. As illustrated, the metal tube 18 extends at the one end slightly beyond the end cap 22 and the prefilter material so as to fit into a fluid-flow opening, such as the outlet of a diesel exhaust crankcase vent opening. Axial compression of the ends of the filter tube effects a compression of the semirigid wall of fibers at each end to form an end seal without the need for other gaskets. Fluid flow enters the inside of the filter and flows from the inside to the outside successively through the prefilter glass fibers 16, the bonded glass-fiber filter tube wall 12, and the oil-coalescing filter sleeve 24, as illustrated by the representative flow arrows of the drawing.

Figure 2:
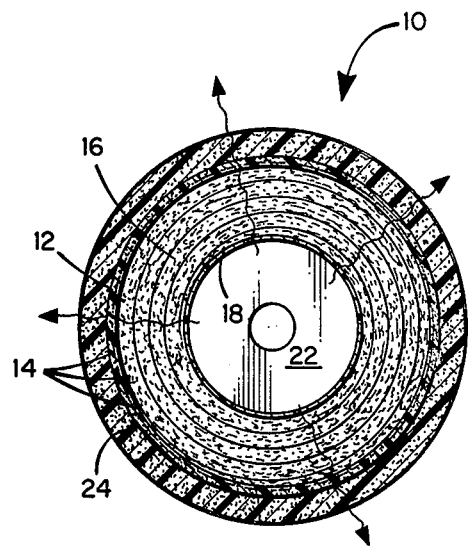
FIG. 2 is an enlarged cross-sectional view of the filter tube assembly of FIG. 1 along the lines 2—2.

FIG. 2 is an enlarged cross-sectional view of the filter tube assembly of FIG. 1, showing in particular the overlapping contacting of the scrim material 14 within the filter tube wall 12.

Figure 3:
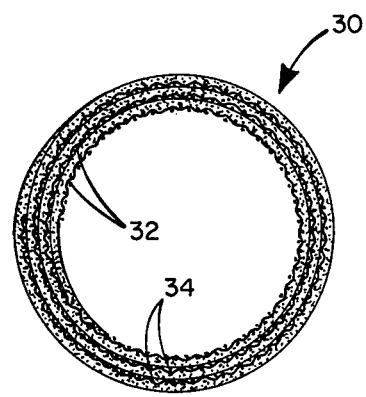
FIG. 3 is an enlarged cross-sectional view of another embodiment of a filter tube of our invention.

FIG. 3 is an enlarged cross-sectional view of a filter tube prepared as set forth in Example 2; i.e., by the mat rather than the mandrel method of Example 1. This drawing illustrates the helical coil of a scrim material 32 in a filter tube 30, with the intervening wall of bonded glass fibers 34 of the tube separating the scrim material. In the illustration shown, most of the internal wall surface of the tube 30 is surrounded by the scrim material, with the other end of the scrim material embedded in the bonded filter wall of the tube, and not extending to the external wall surface of the tube. With a representative 2-inch internal diameter filter tube with a mat of 24 inches in length and a scrim material of 8 to 20 inches, the revolutions of the scrim would be about 1½ to 3 revolutions. In the drawing illustrated, the scrim material is placed on the fiber mat about ½ of an inch to 1 inch from one end prior to being rolled into tube form, dried and bonded.

EXAMPLE 1

A filter tube with improved burst strength is required to coalesce and remove liquid droplets; e.g., oil, from compressed air. The life of present filter tubes is generally adequate for normal use, since the air is usually contaminated primarily with liquids which continuously drain from the filters, rather than with solids which tend to plug the filter tubes. However, surges in air flow, such as when a compressor starts up, make improved burst strength a most desirable commercial property. Approximately 5 to 20 grams (dry weight); e.g., about 10 to 12 grams, of glass fibers, having a diameter of from about 1 to 2 microns, are formed from a water slurry of the fibers onto a vacuum mandrel 2-inch cylinder outside diameter and 22 inches long. A glass-fiber woven scrim 20 inches × 21½ inches, with approximately ⅜ of an inch square openings of multifilament glass fibers, is wrapped around the fibers on the forming cylinder so that the scrim forms approximately 3 contacting overlapping revolutions around the formed fibers, virtually the entire length of the tube. An additional 40 to 60; e.g., 45 to 50, grams of fibers are then deposited on the cylinder, so that the scrim is encapsulated within the continuous wall of the fibers of the filter tube so formed, and positioned within the inner third of the internal wall thickness. The tube is then dried and impregnated and bonded with epoxy resin as a binder. The reinforced tube had an average burst strength of 38.8 psi and an average collapse strength of 25.0 psi, while a nonreinforced tube made by the same technique had an average burst strength of 25.0 psi and an average collapse strength of 19.8 psi.

EXAMPLE 2

A wet mat of borosilicate glass fibers formed from an aqueous dispersion of the fibers about 10 inches × 22 inches, containing 20 to 40 grams; e.g., 30 grams, of glass fibers (dry weight), is formed on a screen. A glass scrim 9½ inches × 21½ inches, containing approximately ¼ of an inch square openings, is placed on the fiber mat, and then the mat containing the scrim is carefully rolled into a cylinder on a vacuum mandrel of 2-inch outside diameter. The filter tube so formed has the construction of generally three overlapping, but noncontacting, layers of scrim material in a generally helical coil form, with a layer of glass fibers of selected depth separating each layer of scrim, the glass fibers forming a continuous wall through the openings in the scrim. The width of the scrim material is selected based on the filter tube size, so that no scrim material is on or extends to the external filter tube wall, but rather ends short of the external wall surface. The tube is bonded with organosilicone resin binder as described in U.S. patent application Ser. No. 523,587, filed Nov. 14, 1974, herein incorporated by reference (now U.S. Pat. No. 3,972,694, issued Aug. 3, 1976). The average burst strength of tubes with such scrim reinforcing was 52 psi, while the burst strength of a tube of the same construction, only without the helical coil of the scrim, was only 25 psi.

EXAMPLE 3

In other examples, other filter tubes were made by the methods described above, using different bonding resin contents, different compositions and a different number of wraps of reinforcing scrim. In all examples in comparison with similar tubes, identical with the exception of the use of the reinforcing scrim, the data illustrate a significant increase in burst strength imparted by the scrim. Particularly in connection with the helical coil tubes of Example 2, the increase is unexpected, since the scrim is simply helically wrapped within the tube. The collapse strength data given show that our reinforcing technique is useful to improve burst strength and has essentially no beneficial significant effect on collapse strength, and, therefore, the reinforcing technique is particularly beneficial only and useful when the filter tube is to be used in the inside-to-outside flow direction.

EXAMPLE 4

It has been discovered further, and most unexpectedly, that the position and placement of the scrim material, as set forth in Example 1, are of importance as to the burst strength of the tube. In the preferred embodiment of an overlapping contacting scrim material as in Example 1, the scrim material should be positioned less than a majority of the wall thickness from the internal wall surface, and typically less than about 35%; e.g., 10 to 35%. The following test data illustrates the burst strength is increased as the scrim moves near the inside diameter.

| Comparison of Filter Tubes Using Differing Scrim Positions | | |
|---|---|---|
| Average Burst Pressure (psi) | | |
| B-type filter tube (without scrim) | 19.5 | (range 17–21 psi) |

-continued

Comparison of Filter Tubes
Using Differing Scrim Positions
Average Burst Pressure (psi)

| | | |
|---|---|---|
| B-type filter tube scrim near I.D. (⅓ of distance from I.D.) | 43.5 | (range 40–48 psi) |
| B-type filter tube scrim near O.D. (⅔ of distance from I.D.) | 32.0 | (range 25–38 psi) |

EXAMPLE 5

A filter with increased capacity to retain dirt and viscous oil droplets, while maintaining very low flow resistance, is required as a fume filter on diesel engine crankcase vent. Flow direction through the filter tube is inside-to-outside, because a portion of the collected oil is sufficiently fluid to drain from the outside of the filter tube after being coalesced. However, the viscous non-draining portion of the oil mist coats the fibers of a conventional filter tube and causes an unacceptable pressure drop in a short period of time. A 2-inch ID × 9 inches long × ⅛ of an inch thick filter tube composed of borosilicate glass fibers is utilized to filter diesel engine crankcase exhaust, for example, at a flow rate of about 1.5 CFM and 0.4 – 0.5 inches water initial pressure drop. At the end of 100 hours, the pressure drop across the filter tube would rise to over about 3.0 inches water, an unacceptable level.

Next, an internal packing consisting of relatively low-density coarse glass fibers in random-batt form is rolled about a perforated metal internal mandrel of 1-inch OD and is inserted into the center of a filter tube of the same size and composition as described in Examples 1 and 2, and a means to retain the packing, such as end caps, inserted into each end of the filter tube to retain the internal packing. Diesel engine crankcase exhaust is passed through the filter in the inside-to-outside direction. The improved filter operates significantly over 100 hours before the pressure drop rises to an unacceptable level. The internal coarse glass-fiber packing traps most of the dirt and viscous liquid droplets, thereby preventing these materials from coating the relatively finer and denser glass fibers of the borosilicate fiber filter tube. The tube is then able to function satisfactorily over a relatively long time period as a continuous coalescing filter for the less viscous oil droplets.

EXAMPLE 6

It is desired to separate a small quantity of oil droplets dispersed in a relatively dirty aqueous liquid. A filter tube composed of borosilicate glass fibers with epoxy resin binder, 2-inch ID × 9 inches long × ⅛ of an inch thick with a ⅛ of an inch thick external sleeve composed of open-cell foam; e.g., urethan, is used to separate the solution with flow in the inside-to-outside direction. The advantages of inside-to-outside flow direction for this type of application have been described above. The use of an open-cell urethane foam sleeve, or another type of coarse fibrous or foam porous material, such as molded cellulose or felted organic fibers, as a final separating element in a coalescing application, is well known and is not alone a part of our invention.

The filter tube described above performs an extremely efficient separation of the two phases, reducing the oil content in the aqueous phase to less than 10 parts per million (ppm). However, its practical applications are quite limited, because the high dirt content in the liquid tends to block the flow passages of the filter rapidly, raising the pressure drop across the filter, and the relatively low burst pressure of the filter causes the filter element to rupture after a few hours service. A filter tube with internal glass scrim reinforcing, made as described in Example 2 above, is filled with about 20 to 40 grams of relatively coarse insulation-grade glass fibers rolled on a perforated metal mandrel, and a polyurethane open-cell foam sleeve was applied and fitted to the outside of the tube. When used to separate the oil-water mixture described above in this example, this filter tube gave the same separation efficiency as the standard tube, but, however, it provided a 3-to-5-fold increase in time or useful life before exhibiting the same pressure drop as the standard filter tube. This improved filter tube was able to function satisfactorily for an additional period of time, because the increased burst pressure permitted safe operation at higher differential pressure than the unsupported tube.

EXAMPLE 7

A borosilicate glass-fiber filter tube with a cured silicone resin binder, reinforced with a glass scrim as described in Example 2, is packed with a sorbent material; e.g., diatomaceous earth, around a porous internal flow distribution tube, and end caps are inserted in the tube to prevent the diatomaceous earth from being dislodged from the annular space between the porous inner flow distributor and the outer filter tube. Water containing a slimy organic material, such as algae, is flowed through the filter from inside-to-outside and is filtered clean and bright with relatively good filter life. A standard filter tube without diatomaceous earth internal prefiltration is plugged virtually immediately by the slime. Inside-out filtration with the diatomaceous earth preloaded into the filter tube is far more convenient than the conventional outside-in filtration with external precoat. However, inside-out filtration is practical only with the internally-reinforced filter tube.

What we claim is:

1. An inside-to-outside flow filter tube of improved burst strength, which filter tube comprises:
   (a) a plurality of randomly disposed, nonwoven glass fibers having a diameter of from about 0.001 to 10 microns, and having interstices therebetween, the fibers bonded together into a self-supporting filter tube by a bonding agent at the junction of the fiber crossover points to form a filter tube wall, and
   (b) an open scrim sheet material embedded within said filter tube wall, with no scrim material extending to the external filter tube wall, the scrim material extending generally the length of the filter tube and at least about one and one-half revolutions about the tube diameter, the scrim material formed into a generally noncontacting helical scroll with a layer of glass fibers of selected depth separating each convoluted layer of scrim material, the glass fibers bonded cooperatively with and through the scrim material by the bonding agent, to form a continuous, integrally bonded filter tube wall means of the glass fibers, said filter tube having an average burst strength of greater than about 52 P.S.I.

2. The filter tube of claim 1 wherein the glass fibers are borosilicate glass fibers.

3. The filter tube of claim 1 wherein the diameter of the glass fibers ranges from about 0.03 to 8 microns.

4. The filter tube of claim 1 wherein the ends of the filter tube, on axial compression, form a self-sealing gasket against a surface at each end.

5. The filter tube of claim 1 wherein the bonding agent is a hardened resin material.

6. The filter tube of claim 5 wherein the bonding agent is a thermosetting phenol-formaldehyde resin, an epoxy resin or a silicone resin.

7. The filter tube of claim 5 wherein the bonding agent is silica or quaternary ammonium silicate.

8. The filter tube of claim 1 wherein the filter tube wall thickness ranges from about 0.1 to 0.2 inches and the tube has a fiber density of about 0.15 to 0.25 grams/cc.

9. The filter tube of claim 1 wherein the scrim material extends up to about five revolutions about the tube diameter.

10. The filter tube of claim 9 wherein the scrim material extends from about three to five revolutions about the tube diameter.

11. The filter tube of claim 1 wherein the scrim material extends generally uniformly throughout the filter tube wall thickness.

12. The filter tube of claim 1 wherein the scrim material extends concentrically about and is integrally bonded to the internal wall surface of the filter tube.

13. The filter tube of claim 1 wherein the scrim material has regular and generally uniform openings of from about ¼ to 1 inch in size.

14. The filter tube of claim 1 wherein the scrim material comprises a glass-fiber scrim material.

15. The filter tube of claim 1 which includes a peripheral layer adjacent the internal wall surface of the filter tube of a pretreatment material for the fluid to be filtered by the filter tube.

16. The filter tube of claim 15 wherein the pretreatment material comprises a layer of glass fibers.

17. The filter tube of claim 15 which includes an internal, perforated, tubular material centrally positioned within the filter tube, the pretreatment material retained between the internal surface of the filter tube and the external surface of the mandrel.

18. The filter tube of claim 17 which includes a helically would mat of coarse glass fibers wound about the mandrel as the pretreatment prefilter material, the helical mat and mandrel snugly fitted within the interior of the filter tube.

19. The filter tube of claim 18 which includes cap means at each end of the filter tube between the internal surface of the filter tube and the external surface of the mandrel to seal and retain the pretreatment material.

20. The filter tube of claim 1 wherein the filter tube includes an outer peripheral sleeve, about the external wall surface of the filter tube, of porous material as a coalescing filter.

21. An inside-to-outside flow filter tube of improved burst strength, which filter tube comprises:
(a) a plurality of randomly disposed, nonwoven glass fibers having a diameter of from about 0.01 to 8 microns, and having interstices therebetween, the fibers bonded together into a self-supporting filter tube by a hardened resin bonding agent at the junction of the fiber crossover points to form a filter tube wall; and
(b) an open scrim sheet material of glass fibers having openings of about ¼ to 1 inch and embedded within said filter tube wall, with no scrim material extending to the external filter tube wall, the scrim material extending generally the length of the filter tube and from about one and one-half to five revolutions about the tube diameter, the scrim material formed into a generally noncontaining helical scroll, with a layer of glass fibers of selected depth separating each convoluted layer of scrim material, the glass fibers bonded cooperatively with and through the scrim material by the bonding agent, to form a continuous, integrally bonded filter tube wall of the glass fibers, said filter tube having an average burst strength of greater than about 52 P.S.I.

22. A method of filtering a fluid stream, which method comprises:
(a) introducing the fluid stream to be filtered into the interior of an inside-to-outside flow filter tube, which filter tube comprises:
(i) a plurality of randomly disposed, nonwoven glass fibers having a diameter of from about 0.001 to 10 microns, and having interstices therebetween, the fibers bonded together into a self-supporting filter tube by a bonding agent at the junction of the fiber crossover points to form a filter tube wall, and
(ii) an open scrim sheet material embedded within said filter tube wall, with no scrim material extending to the external filter tube wall, the scrim material extending generally the length of the filter tube and at least about one and one-half revolutions about the tube diameter, the scrim material formed into a generally noncontacting helical scroll, with a layer of glass fibers of selected depth separating each convoluted layer of scrim material, the glass fibers bonded cooperatively with and through the scrim material by the bonding agent, to form a continuous, integrally bonded, filter tube wall means of the glass fibers; and
(b) filtering the fluid stream by passage through the porous filter tube wall of the filter tube, said filter tube having an average burst strength of greater than 52 P.S.I.

23. The method of claim 22 wherein the fluid stream is a compressed air stream containing oil vapor to be removed by the filter.

24. The method of claim 22 wherein the fluid stream is an exhaust gas stream of an engine.

25. The method of claim 22 wherein the fluid stream is a liquid stream containing an immiscible, dispersed, liquid phase therein to be removed by the filter.

26. The method of claim 22 which includes:
(a) flowing the fluid to be filtered through a layer of coarse glass fibers forming a layer on the inside of the filter tube; and
(b) after passing through the filter tube wall through a layer of porous coalescing material, surrounding the external surface of the filter tube.

27. The method of claim 22 wherein the filter tube includes prefilter material dispersed in the interior of the filter tube, and which method includes passing the fluid stream from the inside to the outside through the prefilter material prior to filtration by the filter tube wall.

28. A method of filtering a fluid stream, which method comprises:

(a) introducing the fluid stream to be filtered into the interior of an inside-to-outside flow filter tube, which filter tube comprises:
  (i) a plurality of randomly disposed, nonwoven glass fibers having a diameter of from about 0.01 to 8 microns, and having interstices therebetween, the fibers bonded together into a self-supporting filter tube by a hardened resin-bonding agent at the junction of the fiber crossover points to form a filter tube wall, and
  (ii) an open scrim sheet material of glass fibers having openings of about ¼ to 1 inch and embedded within said filter tube wall, with no scrim material extending to the external filter tube wall, the scrim material extending generally the length of the filter tube and from about one and one-half to five revolutions about the tube diameter, the scrim material formed into a generally noncontacting helical scroll, with a layer of glass fibers of selected depth separating each convoluted layer of scrim material, the glass fibers bonded cooperatively with and through the scrim material by the bonding agent, to form a continuous, integrally bonded, filter tube wall of the glass fibers; and
(b) filtering the fluid stream by passage through the porous filter tube wall of the filter tube, said filter tube having an average burst strength of greater than 52 P.S.I.

* * * * *